United States Patent [19]
Fertik

[11] 3,953,188
[45] Apr. 27, 1976

[54] CONTROL SYSTEM FOR MOLD COOLING IN GLASS FORMING MACHINE

[75] Inventor: Harry A. Fertik, Philadelphia, Pa.

[73] Assignee: Leeds & Northrup Company, North Wales, Pa.

[22] Filed: May 5, 1975

[21] Appl. No.: 574,224

[52] U.S. Cl. .................................... 65/162; 65/29; 65/161
[51] Int. Cl.² ..................................... C03B 25/04
[58] Field of Search ......... 65/29, 161, 162, DIG. 13

[56] References Cited
UNITED STATES PATENTS

| | | | |
|---|---|---|---|
| 3,393,868 | 7/1968 | Griem, Jr. | 65/162 |
| 3,416,908 | 12/1968 | Goodwin et al. | 65/162 |
| 3,506,427 | 4/1970 | Griem, Jr. | 65/162 |
| 3,860,407 | 1/1975 | Fertik | 65/29 X |

Primary Examiner—Arthur D. Kellogg
Attorney, Agent, or Firm—William G. Miller, Jr.; Raymond F. MacKay

[57] ABSTRACT

There is disclosed a system for controlling the cooling of the molds in a glass forming machine which involves compensating the pressure set point for the control of the cooling air to correct for changes in the temperature of the cooling air and changes in the mass flow rate of the glass. During maximum and minimum flow conditions for the cooling air the heat transfer equilibrium between the coolant and the parisons being cooled is modified as by modifying the set points of the temperature controllers on the feeder supplying the forming machine or alternatively by changing the speed of the forming machine so that the parisons tend to stay at the desired temperature with the limited range of coolant supply.

6 Claims, 2 Drawing Figures

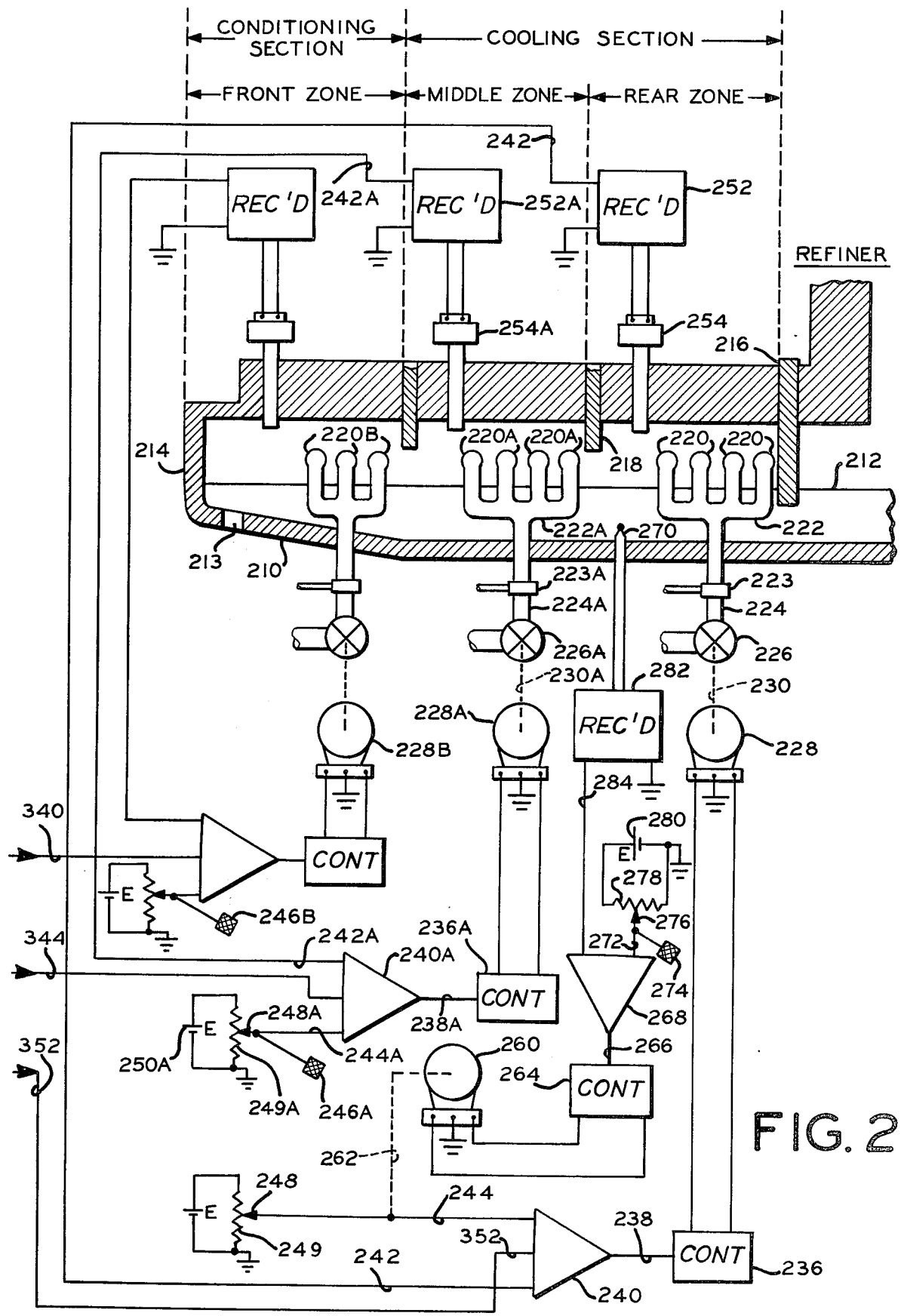

CONTROL SYSTEM FOR MOLD COOLING IN GLASS FORMING MACHINE

BACKGROUND OF THE INVENTION

This invention relates to a method and apparatus for the manufacture of glass articles and more particularly to control means for automatically maintaining a relatively constant parison temperature under conditions which cause the flow of cooling air to be at a limit.

One of the most common methods for manufacturing glass articles such as bottles, jars and similar containers is by means of blowing machines which take successive gobs of glass as they are sheared from the outlet of a glass feeder. Those gobs are first fed to blank molds where the parison is formed, then after the parison is formed the individual blanks or parisons are automatically transferred to blow molds where they are blown to final form. At each of the positions in the bottle production process, that is, both where the parison is formed and where the bottle is blown, there are orifices positioned on both sides of the molds so that air is blown onto both sides of the molds thus cooling the molds and the glass in the molds. It is well known that the temperature in the glass parison at the time of blowing affects the distribution of glass in the blowing of the article. It is therefore advantageous to maintain as constant as possible the temperature distribution of the parison as by maintaining the temperature at a particular point on the parison in the production of the successive parisons so that optimum blowing occurs. This temperature may be referred to simply as the parison temperature, it being understood that such a reference relates to the temperature at a fixed point on the parison at a particular time in each successive formation of a parison.

It will be understood that the air cooling system supplying the air to the orifices for the cooling of the parison is normally common for a number of sections of a glass forming machine and sometimes common to several machines. Thus, the main duct which supplies the air branches off to the several sections of each machine. Certain branches of the cooling system for one machine are at times shut off and at other times all of the branches to one of the machines may be shut off, for example, when that particular machine is shut down. In either case the available number of openings allowing air flow will be varied and this variation can have a wide range, as when a whole machine is shut down. Such variations in the number of outlets in the cooling system will naturally cause a variation in the pressure of the system so that the amount of cooling air flowing from the remaining orifices will vary unless the cooling system is subject to pressure control as by the adjustment of the total air flow in the system.

Normally, the air used in cooling is ambient air from outside the plant and therefore the cooling effect of the air is subject to change due to seasonal and daily temperature changes as well as because of the change in the rate of flow resulting from closing some orifices. For example, the temperature of the air may vary over a wide range between winter and summer as well as between day and night, also in some cases variations in the humidity may be significant. Since the temperature can change significantly and since it affects the cooling properties of the air, it is desirable to compensate for change in temperature.

Other factors which influence the temperature of the parison include the average rate of heat input to the molds from the glass being supplied to the molds. A change in the rate of heat input may result, for example, from a change in the mass flow of the glass due to an increased rate of production, that is, an increased number of gobs per minute, or an increased weight per gob of glass, or from an increase in the temperature of the gob as it is supplied to the blank mold. It is necessary when there is a variation of the heat input to the molds to modify the flow of cooling air in order to maintain a constant parison temperature.

Both the changes in the cooling effect of the air and the changes in the average rate of heat input may be considered to be disturbances to the heat transfer equilibrium between the cooling air and the parisons which is maintaining the parison temperature. After such a disturbance it is, of course, desirable that a new equilibrium condition be established to provide the desired parison temperature. The modified equilibrium condition is in effect a new equilibrium level in that the rate of heat transfer is modified, that is the heat input is changed and, of course, the cooling rate must be changed to maintain an equilibrium between them so that the parison temperature remains constant.

Prior art systems have attempted to maintain the temperature of the parison constant by measuring the temperature of the parison as closely as possible and by varying the air flow in response to changes in the parison temperature so as to tend to maintain it constant. Thus, the prior art systems have relied upon direct measurements and feedback control as a basis for controlling the temperature. Such direct measurements are difficult to make with any degree of accuracy under conditions such as exist in glass forming machines. Therefore, it is desirable to control the temperature of the parisons without using direct temperature measurement. This is accomplished by the temperature control system disclosed in my U.S. Pat. No. 3,860,407, which issued Jan. 14, 1975. In using the control system described by the patent it is sometimes found that the ambient temperature of the cooling air is either too high or too low for proper operation of the control system. For example, when high summer air temperatures are experienced the cooling effect of the air blown on the molds for the parisons is insufficient for the particular temperature at which the glass feeder is supplying glass to the forming machine for the particular speed at which the forming machine is being operated. Under such conditions the control system of the above mentioned patent will operate to increase the pressure of the cooling air in the ducts to be maximum that can be provided by the fans supplying the air. A similar problem arises when the temperature of the ambient air is low as in the winter. Under such conditions the cooling effect is so great that an unacceptably low flow of air on the molds would result and the cooling would not be sufficiently uniform to maintain the needed product quality. Usually a lower limit for the duct pressure is established to maintain the minimum flow of cooling air.

Under both conditions mentioned above its is necessary to take some action which will maintain the parison temperature as nearly constant as possible. It is therefore an object of this invention to provide an improvement on the control system of the above mentioned patent which will be effective to maintain the parison temperature at its desired value when the ambient temperature conditions are such that the pressure control cannot it the needed range of cooling air flow because of the limits established on the duct pressure.

SUMMARY OF THE INVENTION

In carrying out the invention there is provided an improvement on the control system of U.S. Pat. No. 3,860,407 which utilizes means for comparing a signal indicative of the pressure in the duct carrying the cooling air with a limit value for that pressure and means operable when that signal goes beyond its limit value for modifying the heat transfer equilibrium between the air cooling system and the parisons so as to maintain the parison temperature at its desired value.

BRIEF DESCRIPTION OF THE DRAWINGS

FIG. 2 is a schematic diagram, partially in block form, for the feeder temperature control system showing modification of that system in accordance with one form of this invention.

DESCRIPTION OF THE PREFERRED EMBODIMENT

Figure 1:
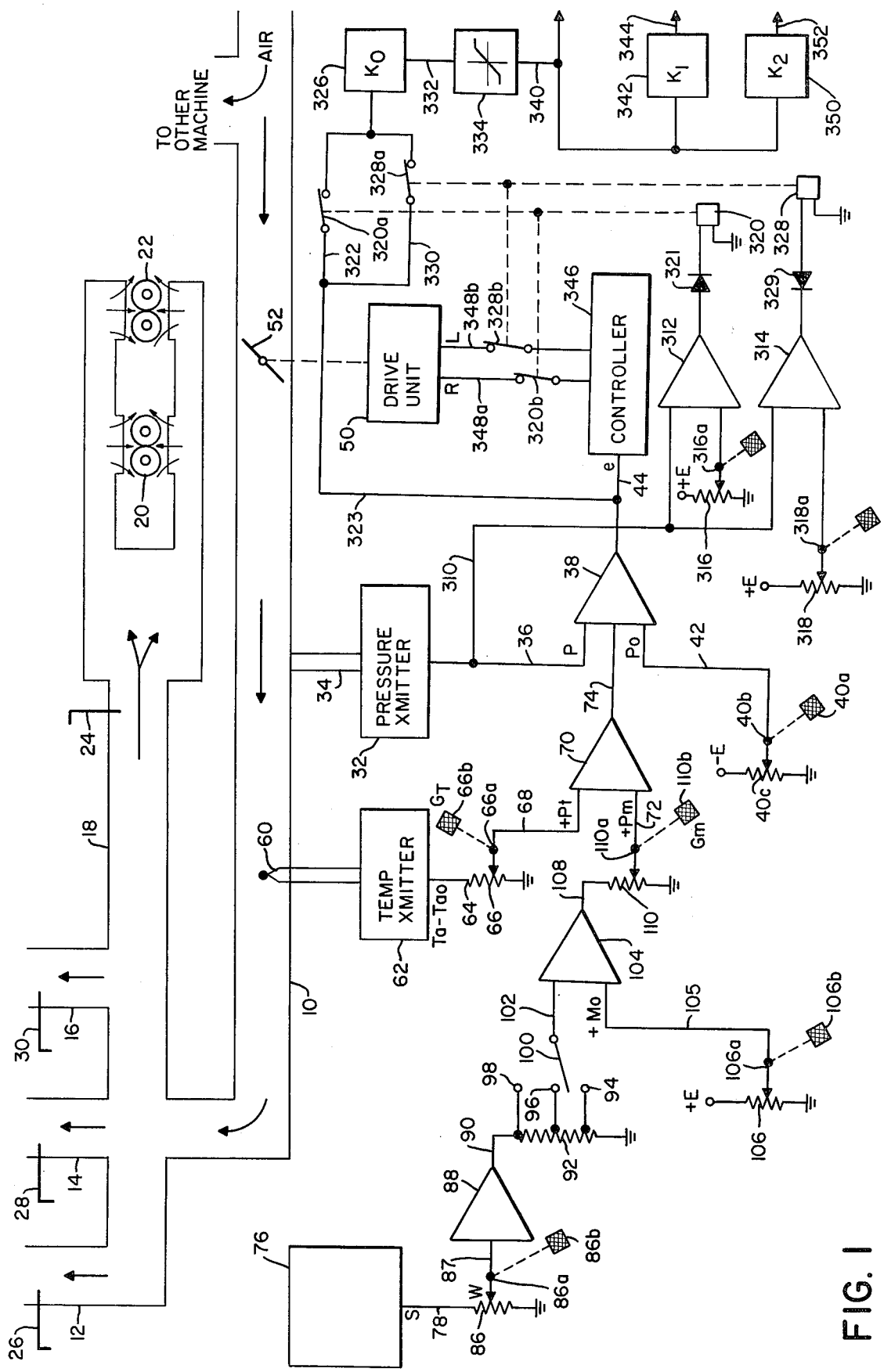
FIG. 1 is a schematic diagram, partially in block form, of the pressure control system of U.S. Pat. No. 3,860,407 as it can be modified to carry out the object of this invention.

FIG. 1 shows the control system of U.S. Pat. No. 3,860,407 modified by the additions and changes identified by reference numerals in the 300 series. The disclosure of the specification of U.S. Pat. No. 3,860,407 is hereby incorporated by reference.

Briefly the system disclosed in the above mentioned patent controls the cooling of the molds in a glass forming machine so as to compensate the set point of the pressure control which maintains the cooling air flow at a constant value so as to correct for changes in the temperature of the cooling air and in the mass-flow rate of the glass.

Usually, air cooling systems consist of a main duct such as duct 10 which supplies air to branches 12–18 for the several sections of each glass forming machine. Certain branches will at times be shut off, as for example by the slides 24–30, when the associated forming machine is shut down. Under such conditions, there being a change in the number of outlets in the cooling system, there will be a resultant variation in the pressure in the cooling system. It is necessary to control that pressure in order to maintain the air flow in the remaining outlets constant. Thus, the pressure transmitter 32 has its output signal P compared with the set point $P_0$ and the damper valve 52 is operated by the controller 346 to maintain the pressure in the main duct at the desired value. The set point $P_0$ is compensated for variations in the temperature of the air supplied by the main duct. In that connection the temperature transmitter 62 transmits a signal representative of the difference between the temperature of the actual air and a standard value, and by using a particular gain factor $G_t$, the signal $P_t$ is obtained as an input to amplifier 70 and thus, by way of the signal on line 74 to amplifier 38, varies the effective set point for the pressure.

The effective set point for the pressure control is also varied in accordance with the signal $P_m$ which responds to a change in mass-flow rate of the glass. That signal is obtained by using a speed measuring device 76 which produces a signal on line 78 indicative of the speed at which the machine is operating, as for example, in cuts per minute of the glass being fed to the machine by the feeder 210 of FIG. 2. The speed signal S is then multiplied by the weight signal W and the product is fed through amplifier 88 whose output signal is then multiplied by a factor indicative of the number of gobs per shear cut from the feeder, which is a setting established by the variable contact 100. The resultant signal on line 102 is then compared with a signal $M_0$ indicative of the nominal glass flow rate in pounds per minute so that the output of the amplifier 104 on line 108 when multiplied by the factor $G_m$ through potentiometer 110, gives the signal $P_m$ for varying the pressure set point.

The signal on line 310 is a signal indicative of the measured pressure P transmitted by transmitter 32. That signal is compared in amplifiers 312 and 314 to the respective high and low limit values for the pressure as predetermined by the settings of the contacts 316a and 318a of the respective potentiometers 316 and 318. The slidewires 316 and 318 are supplied from a potential source of value +E as shown in FIG. 1.

It will be evident to those skilled in the art that a signal indicative of the pressure set point $P_0$ plus the bias appearing on line 74 could be used in place of P as a pressure indicative signal. For the purposes of this specification both P and $P_0$ as modified by the signal on line 74 will be known as the pressure indicative signal.

When the pressure indicative signal reaches the high limit established by the position of contact 316a the amplifier 312 will energize the relay actuator 320 by current flow in a forward direction through diode 321 to pull in contact 320a and open contact 320b. Contact 320a is in line 322 which is connected by way of line 323 to line 44 which carries the signal e. Contact 320b is in the line from controller 346 to drive unit 50 which carries the raise pulses to the drive unit. Opening contact 320b prevents the drive unit from opening valve 52 farther than desired.

Upon the closing of contact 320a the signal e, which represents the deviation of the pressure P from its modified set point, is transmitted as an input to a multiplier 326 where it is multiplied by a constant $K_0$ whose units are in degrees Fahrenheit per inch of water column and may be of value from 0–10, for example.

If on the other hand the pressure indicative signal on line 310 is reduced to a value corresponding to the low pressure limit as set by contact 318a, then the amplifier 314 energizes relay actuator 328 by current flow in a forward direction through diode 329 and pulls in contact 328a and opens contact 328b. By pulling in contact 328a the signal e is connected as an input to multiplier 326 by way of line 330.

As shown in FIG. 1, the controller 346 is of the type which operates the drive unit 50 by sending raise pulses over line 348a or lower pulses over line 348b depending on whether the drive unit is to be driven to open or close valve 52. Upon the opening of contact 328b the valve 52 cannot be closed to any greater extent and thus no less than the desired minimum flow rate of cooling air will be directed at the molds such as 20 and 22, for example.

When the pressure indicative signal has reached one of its limit values the deviation signal is multiplied by a gain constant $K_o$ as set forth above. The resulting product is represented by the signal on line 332. That signal is introduced as an input to the limiting circuit 334 which has a characteristic as shown in the block. It will thus be evident that the output of limit circuit 334 will vary directly with the input until the input reaches a limit value, either low or high, beyond which point the output will remain constant at the limit value. The limit values may, for example, be ±15°F.

The signal output from the limit circuit 334 provides on line 340 the signal for modifying the set points of the temperature controls for the several zones of the feeder 210 of FIG. 2, as will be described below.

The signal from line 340 provides the modifying signal for the set point of the front zone of the feeder. To obtain the modifying signal for the set point of the middle zone of the feeder 210 the signal on line 340 is multiplied by the gain factor represented by constant $K_1$ in multiplier 342 so as to produce that modifying signal on line 344. Similarly the signal on line 340 is multiplied by the gain constant $K_2$ in multiplier 350 to produce on line 352 the modifying signal for the temperature set point for the rear zone of feeder 210. Both $K_1$ and $K_2$ may, for example, have values from zero to one as necessary to maintain the desired temperature profile through the feeder.

From the above description it will be evident that as long as the temperature of the cooling air allows a control of the temperature of the parisons at the desired value by varying the position of valve 52 within the limits established for its operation, then the system of FIG. 1 operates as set forth in U.S. Pat. No. 3,860,407. However, when the control of valve 52 moves it to a limit as established by either the setting of contact 316a or contact 318a, then the drive unit is stopped and the error signal to the controller 346 is used as a signal for modifying the set points of the controls on the temperature of the glass being fed from the glass feeder. It will be recognized that the error signal e on line 44 is at a value of zero whenever the duct pressure is proper for maintaining the parison temperature, however, the signal e will change and will have a value and sign indicative of the magnitude and direction which the set points for the feeder temperature control must be changed to cause the needed change in temperature of the glass being fed to make the parisons so that their temperature will be at its desired value. The relationships between the error signal e and the set points for the feeder temperature control is established by the constants $K_0$, $K_1$ and $K_2$ with the change in set points being limited by the limit circuit 334. The feeder temperature controls will, of course, continue to change the temperature of the glass fed to the molds as long as the error signal is not zero due to the reset action provided by the feeder temperature controllers.

The glass feeder 210 is shown in cross section with the construction aspects of the feeder being simplified. The feeder itself is normally a long channel constructed of brick, capable of withstanding high temperatures. The glass is introduced into the feeder 210 as from the refining section of the glass making process so that there may, for example, be a depth of glass 212 in the feeder which may, for example, be regulated to a value in the range of 6 to 8 inches, more or less. As the glass flows from the refiner to the gob forming orifice 213 at the end of the conditioning section, namely, at the end 214, the glass first has its surface intercepted by a skimmer block 216 as it goes into the rear zone of the cooling section. That rear zone is defined by the downward projecting structure 218 and contains, in the arrangement shown, burners 220 which are connected through the manifold 222 and the fuel-air mixing valve 223 to an air supply line 224 which contains a flow regulating valve 226, normally subject to control by the positioning motor 228 to which it is mechanically coupled by the linkage 230.

While it will be recognized that in some feeders there is provided not only a means for heating the glass as, for example, by combustion from the burners 220, but also means for cooling the glass by the blowing of air over the surface of the glass in the feeder; for the purpose of this description, there is only shown a means for heating the glass. Both heating and cooling will be referred to as thermal transfer. It is well known to those skilled in the art that cooling means and heating means may be sequentially and/or coordinately controlled by any of a number of well known systems.

As the glass flows along its normal path from the rear zone to the middle section it comes into the area which is heated by the set of burners 220A, which are similarly connected from the manifold 222A and mixing valve 223A to the pipe 224A so that the flow of fuel through the pipe may be controlled by the valve 226A in accordance with its position. The position is, of course, established by the motor 228A through the linkage 230A.

After leaving the middle zone of the cooling section, the glass flows into the front zone which forms the conditioning section of the heater and in that section the temperatures are subject to control by heat from the burners 220B which are subject to control by the motor 228B in a manner similar to that described for the previous zones.

In some control systems the approach to temperature control is to have each zone controlled as are the middle and front zones of the figure. For example, in the middle zone it is evident that the flow of fuel to the burners 220A is controlled by the positioning of valve 226A through the operation of the positioning motor 228A in response to controller 236A. The controller 236 A may be any of a number of well known two or three mode controllers for providing the operation of the positioning motor 228A in accordance with a proportional, reset and rate response to the error signal appearing on line 238A as an output from the differential amplifier 240A. The controller 236A may, for example, be constructed to have a circuit similar to that shown in U.S. Pat. No. 3,693,067 — issued on Sept. 19, 1972 to Thomas J. Walsh, a coworker of mine.

As is evidenced from the figure, the error signal appearing on line 238A varies directly with the deviation of the measurement signal appearing on line 242A from the setpoint signal appearing on line 244A as modified by the signal on line 344. The temperature setpoint for the middle zone is set by the knob 246A which adjusts the contact 248A along the slidewire 249A so that the signal on line 244A will be a predetermined fraction of the potential across the slidewire 249A, namely, the potential E as provided by the battery 250A.

The signal on line 242A representing the temperature measured at the exit area of the middle zone may be derived by retransmission from a recorder 252A which receives an input signal from the total radiation pyrometer 254A which is so positioned that it sights on the surface of the glass as it is about to exit the middle zone. Alternatively, if a record of the temperature is not desired, the recorder 252A may be dispensed with and the output of the total radiation pyrometer 254A may be used more directly in obtaining the input to controller 236A after a comparison with the modified setpoint value.

As shown in the figure, the front zone of the feeder has its temperature controlled by apparatus similar to that just described for the middle zone, however, under normal conditions the setpoint as adjusted by the knob 246B would be adjusted to a different value than the value set by knob 246A depending upon the temperature desired at the end of the feeder for proper gob formation. The setpoint as adjusted by knob 246B is modified by the signal on line 340 to compensate the temperature of the glass fed to the forming machine so that a new heat transfer equilibrium can be established between the air cooling system and the parisons in order to maintain the parisons at their desired temperature when the pressure of the cooling air in the duct 10 has exceeded either a high or low limit. The change in heat transfer equilibrium occurs as a result of the feeder supplying glass at a higher or lower temperature than would be normal when the setpoint set by knob 246B is unmodified by a signal on line 340.

In the many systems the rear zone is likewise controlled by apparatus of the configuration shown for the front zone and the middle zone, and in that sense the motor 228 could be controlled by the controller 236 in response to the error signal appearing on line 238 from the amplifier 240 in response to the deviation between the measurement signal appearing on line 242 as compared with the setpoint signal appearing on line 244 where the measurement signal has a value representing the output signal from the total radiation pyrometer 254 to the recorder 252 as it is retransmitted from the recorder over the line 242. In those systems the signal on line 244 would be determined by a preset adjustment of the setpoint value for the rear zone, however, as an improvement, the setpoint as established by the position of the contact 248 on the potentiometer 249 can be controlled by the positioning motor 260 through the mechanical linkage 262 in response to control signals from the controller 264 which has as its input an error signal on line 266. The controller 264 and the positioning motor 260 may be similar to the controller 236A and the positioning motor 228A.

The error signal on line 266 is developed as an output of the differential amplifier 268 which compares the temperature measured at the bottom region or layer of the glass in the rear zone as with the predetermined setpoint signal on line 272. The bottom temperature is measured by thermocouple 270 and the setpoint signal is established by setting the knob 274 so as to position the contact 276 along with slidewire 278 to tap off a portion of the potential E supplied across the slidewire 278 by the battery 280. As shown in FIG. 2, the temperature measured by the thermocouple 270 is recorded by recorder 282 and the measured value is then retransmitted over line 284 to the amplifier 268 for comparison with the setpoint value.

The thermocouple 270 may, for example, be a platinum clad thermocouple and may be located about 2 inches from the bottom of the feeder (about one-third of the depth of the glass in the feeder) and at a point aligned with the total radiation detector in the rear zone. In some applications it may be desirable to have more than one thermocouple positioned in the bottom of the feeder. In such an arrangement the thermocouples are arranged in a circuit which provides a temperature measurement on line 284 which will represent the average bottom temperature.

It will be evident from the above description of the control from the rear zone that there will be provided a form of cascade control whereby the bottom temperature is utilized to control the setpoint to which the top temperature is controlled.

The setpoint for the rear zone as established by the setting of contact 248 is modified by the signal on line 352.

While the rear and middle zones of the temperature control system for the feeder are not directly connected, it will be evident that they work together to eliminate the disturbances in the glass temperature before it enters the conditioning zone. Except for transients, the temperature of the top layer of glass as measured in the middle zone by the total radiation sensor and the temperature of the bottom layer of glass as measured in the rear zone will be held constant by the system shown in FIG. 2.

The manner in which the control system of FIG. 2 operates may be illustrated as follows: Assuming the temperature distribution of glass from the refiner changes because of a change in the rate of flow of glass through the feeder or other feeders connected to the refiner, and assuming there is an increase in the bottom temperature of the glass from the refiner the temperature regulation in the rear zone is in a manner to tend to decrease the temperature in the top layer of glass since the primary controller 264 will operate to decrease the setpoint for the secondary controller 236. This sense of operation is necessary since the top layer must be reduced in temperature in order to bring the bottom layer back to the setpoint by virtue of the radiation and conduction effecting the thermal distribution in the feeder. When the cooler top layer enters the middle zone, the total radiation measurement made in the middle zone will cause the control in that zone to increase the heat input and since both the top layer of glass in the middle zone and the bottom layer of glass coming from the rear zone are controlled to setpoints, the bottom glass temperature in the middle zone is controlled to a steady state value.

An increase in the top glass temperature from the refiner would not involve any control operations using primary controller 264, but, instead the control would be effected directly in response to the total radiation measurement by the pyrometer 254 through the secondary controller 236.

In order to maintain the desired temperature profile from the rear zone to the front zone it is desirable to modify the middle zone setpoint by a lesser amount than the front zone is modified to maintain the parisons at the desired temperature when the pressure in duct 10 reaches a high or low limit. Similarly the rear zone setpoint would be modified by a lesser amount than the middle zone. Thus the temperature controls for the entire feeder 210 are modified to change the temperature of the glass gobs supplied to the forming machine with a minimum upset to the operation of the feeder.

It will be recognized by those skilled in the art that the heat transfer equilibrium between the mold cooling system and the parisons can be modified by changing the speed of the forming machine. For example, if the cooling air is cool enough to cause the valve 52 to be driven to its limit in the closing direction the parison temperature can be maintained thereafter by increasing the machine speed in proportion to the error signal e. Such an arrangement would, of course, have the advantage of increasing output. Similarly, when the cooling air is sufficiently hot to cause valve 52 to open wide any further change in the heat transfer equilibrium necessary to maintain a constant parison temperature could be effected by slowing down the forming machine. That action would have the disadvantage of reducing output.

Instead of substituting machine speed changes for feeder temperature changes it is, of course, possible to use both approaches. For example, when the cooling air is too cool the first priority can go to increasing machine speed and when that change has been carried out to the fullest desirable extent then the feeder temperature can be increased. Similarly, an excessively high cooling air temperature can cause first priority to be given to reducing the feeder temperature and second priority to decreasing machine speed to maintain parison temperatures. The particular arrangement which should be used depends upon the nature of the control equipment available to modify the speed of the machine and the desirability for making such changes as it is controlled by many operating factors.

Machine speeds may, of course, be changed automatically by modifying the speed setpoint in much the same manner as set forth above for modifying the feeder temperature setpoint.

What is claimed is:

1. In a control system for maintaining a constant temperature for the parisons formed in a glass forming machine supplied from a temperature controlled glass feeder where the parisons are subjected to air cooling by the blowing of air from a duct onto the mold for the parisons and where the control system includes means for varying the pressure of the cooling air in the duct, means for producing a pressure indicative signal, control means operable in response to changes in the pressure indicative signal to control said pressure by controlling the operation of said pressure varying means, said control being responsive to changes in the temperature of the cooling air so as to cause said control means to vary the pressure in said duct to maintain a substantially constant temperature for said parisons as the temperature of said cooling air changes; the improvement comprising,
    means for comparing said pressure indicative signal with a limit value for said pressure, and
    means operable when said pressure indicative signal exceeds said limit for modifying the heat transfer equilibrium between the air cooling system and the parisons so as to maintain the parison temperature at its desired value.

2. The improvement set forth in claim 1 in which the means operable to modify the heat transfer equilibrium includes means for modifying the temperature control of said feeder so as to cause the temperature of the glass supplied to the forming machine to be modified to tend to maintain the parison temperature at its desired value.

3. The improvement set forth in claim 1 in which the means for comparing the pressure indicative signal with a limit value includes;
    means for comparing the pressure indicative signal with a high limit value, and
    means for comparing the pressure indicative signal with a low limit value; and in which the means operable to modify the heat transfer equilibrium includes;
    means operable when said pressure indicative signal exceeds said high limit value for modifying the heat transfer equilibrium by modifying the temperature control of said feeder to reduce the temperature of the glass being supplied to the forming machine, and
    means operable when said pressure indicative signal is below the low limit value for modifying the heat transfer equilibrium by modifying the temperature control of said feeder to increase the temperature of the glass being supplied to the forming machine.

4. The improvement as set forth in claim 3 in which the means for modifying the temperature control of said feeder include
    means for producing a signal corresponding to the measured temperature of the glass in each zone of said feeder,
    means for producing a set point signal for the temperature of each zone of said feeder,
    means for producing a set point biasing signal for each zone of said feeder in proportion to the deviation to which the pressure control means is responsive, and
    control means associated with each of said feeder zones for controlling the temperature of the glass therein in response to the deviation of the measured temperatures of the glass in the respective zones from the set point signal as modified by said set point biasing signals to adjust the temperature of the glass being supplied to the forming machine by a magnitude sufficient to maintain the parison temperature as the temperature of the cooling air varies through magnitude ranges which cause said pressure to be controlled to a limit value.

5. The improvement of claim 4 in which said means for producing a set point biasing signal for each of said feeders includes,
    means for limiting the magnitude of said set point biasing signals, and
    means for establishing different proportions between the biasing signals for each of said zones and the deviation so as to tend to maintain the temperature profile through the zones of said feeder such that a gradual change in temperature of the glass is maintained as it flows from the rear to the front zone of the feeder.

6. In a control system for maintaining a constant temperature for the parisons formed in a glass forming machine supplied from a temperature controlled glass feeder where the parisons are subjected to air cooling by the blowing of air from a duct onto the mold for the parisons and where the control system includes means for varying the pressure of the cooling air in the duct, means for measuring the pressure of the cooling air in said duct, control means operable in response to the deviation of said pressure measurement from a set point value to control said pressure by controlling the operation of said pressure varying means, means for measuring the temperature of said cooling air, and means responsive to changes in said temperature measurement for directly varying the deviation to which said control means is responsive so as to cause said control means to vary the pressure in said duct to maintain a substantially constant temperature for said parisons as the temperature of said cooling air changes; the improvement comprising,
    means for comparing said pressure measurement with a limit value for said pressure, and
    means operable when said pressure measurement exceeds said limit for modifying the heat transfer equilibrium between the air cooling system and the parisons so as to maintain the parison temperature at its desired value.

* * * * *